United States Patent [19]

Barstow et al.

[11] Patent Number: 4,827,404
[45] Date of Patent: May 2, 1989

[54] METHOD AND SYSTEM FOR COMPUTER PROGRAMMING

[75] Inventors: David R. Barstow, Wilton; Paul S. Barth, Georgetown; Richard E. F. Dinitz, Ridgefield, all of Conn.

[73] Assignee: Schlumberger Technology Corporation, New York, N.Y.

[21] Appl. No.: 851,603
[22] Filed: Apr. 14, 1986
[51] Int. Cl.$^4$ .................... G06F 15/38; G06F 15/62
[52] U.S. Cl. .................................................. 364/200
[58] Field of Search ... 364/200 MS File, 900 MS File, 364/300, 190, 191

[56] References Cited

U.S. PATENT DOCUMENTS

| | | | |
|---|---|---|---|
| 4,242,730 | 12/1980 | Golias et al. | 364/900 |
| 4,467,412 | 8/1984 | Hoff | 364/200 |
| 4,591,967 | 5/1986 | Mattes | 364/200 |
| 4,633,436 | 12/1986 | Flurry | 364/900 |
| 4,706,212 | 11/1987 | Toma | 364/900 |
| 4,710,885 | 12/1987 | Litteken | 364/300 |

OTHER PUBLICATIONS

Moriconi & Hare, "Visualizing Program Designs Through PegaSys", *IEEE Computer*, vol. 18, No. 8,8/1985, pp. 72-85.
Reiss, "Graphical Program Development with PECAN Program Development Systems", *Sigplan Notices*, vol. 19, No. 5,5/1984, pp. 30-41.
Raeder, "A Survey of Current Graphical Programming Techniques", *IEEE Computer*, vol. 18, No. 8,8/85, p. 20 and p. 23.
London & Duisberg, "Animating Programs Using Smalltalk", *IEEE Computer*, vol. 18, No. 8,8/85, pp. 61-71.
Brown & Sedgewick, "Techniques for Algorithm Animation", *IEEE Software* vol. 2, No. 1,1/85, pp. 28-39.
Rubin, Golin & Reiss, "Think Pad: A Graphical System for Programming by Demonstration", *IEEE Software*, vol. 2, No. 2,3/85, pp. 73-79.
Galley & Goldberg, "Software Debugging: The Virtual Machine Approach", *ACM-Annual Conference* 1974, pp. 395-401.
Dolotta, Haight & Mashey, "Unix Time-Sharing System: The Programmer's Workbench", *The Bell System Technical Journal*, vol. 57, No. 6, Jul.-Aug. 1978.
Stefik & Bobrow, "Object-Oriented Programming: Themes and Variations", *The AI Magazine*, Winter 1986, pp. 40-62.
Moriconi & Hare, "PegaSys: A System for Graphical Explanation of Program Designs", Proc. *ACM SIGPLAN 85 Symp. Language Issues in Programming Environments*, Seattle, Washington, Jun. 1985, pp. 148-160.
Melamed & Morris, "Visual Simulation: The Performance Analysis Workstation", *IEEE Computer*, vol. 18, No. 8,8/85, pp. 87-94.
Jacob, "A State Transition Diagram Language for Visual Programming", *IEEE Computer*, vol. 18, No. 8, pp. 51-59.
Brown, Herot, Souza, "Program Visualization: Graphical Support for Software Development", *IEEE Computer*, vol. 18, No. 8, pp. 27-35.

*Primary Examiner*—David Y. Eng
*Attorney, Agent, or Firm*—Martin M. Novack; Keith G. W. Smith; David G. Coker

[57] ABSTRACT

A method and system for computer programming provides a graphical editor function for creation and editing of a computer program by manipulation of graphical images on a high-resolution display. The program is specified in terms of a definition language which can be executed by a simulation function. This function simulates execution of the program on a different, target processor as if the program were expressed in a different language which can be executed by the target processor; in addition the simulation function incorporates a simulation of the external environment of the target processor and of the interaction of the program with that environment. The graphical display of the program is animated during execution so that the user can observe and check the program's operation. When the simulated execution is satisfactory the definition-language version of the program is tanslated into the language executable on the target processor.

The invention facilitates effective and efficient programming by allowing use of equipment offering an optimized programming environment irrespective of the capabilities, or lack thereof, of the target processor, and without imposing requirements on the target processor which cannot be provided, are not cost effective or conflict with constraints imposed by its normal operating conditions.

12 Claims, 7 Drawing Sheets

METHOD AND SYSTEM FOR COMPUTER PROGRAMMING

BACKGROUND OF THE INVENTION

This invention relates to methods and systems for computer programming, and particularly, though not exclusively, to methods and systems for assisting the programming of a processor which does not itself provide resources that facilitate efficient programming.

For many years computer programming has generally involved writing sequences of instructions specifying the operations to be performed by a processor in order to accomplish a desired task. Such instructions are expressed in the form of text using a very restricted vocabulary and syntax specific to the programming language employed. This may be an assembly language in which each instruction corresponds to one of the repertoire of primitive operations that the processor can perform, or it may be a 'high-level' language in which each instruction represents a more sophisticated operation itself corresponding to several tens or hundreds of primitive operations. In either case the desired task must be analyzed so that it may be defined in complete and unambiguous detail to an extent dependent upon the level of the programming language to be used. The result of this analysis then must be re-expressed in the form of an exactly corresponding computer program.

Even though present high-level languages enable very complex operations to be defined by each instruction, a typical computer program contains many hundreds or thousands of instructions arranged in an intricate inter-relationship. This provides copious possibilities for errors or deficiencies in the programmed expression of the task to be performed, resulting in failure or inappropriate operation of the computer when it executes the program. The essentially textual format of typical programming languages significantly exacerbates the problem of assimilating and understanding the operation of a program so that it may be compared with desired functions and corrected and extended as necessary.

Various attempts have been made in recent years to alleviate different apects of this problem. Thus a system called PegaSys provides a capability to describe graphically the design of a separately written textual program. This description provides a form of documentation of the program and can also be verified by the system both for internal consistency and for conformity with the textual version (IEEE Computer, Vol. 18, No. 8, August 1985, pp. 72-85). Another system, developed at Brown University, Rhode Island and known as Pecan, enables a program to be written in a language such as Pascal with a text editor which uses information about the allowable syntax of the language to assist the programmer in writing the program (a syntax-directed editor). Representations of the program using other display conventions are simultaneously maintained to provide alternative views of the program and its structure (Sigplan Notices, Vol. 19, No. 5, May 1984, pp. 30-41).

Techniques have been developed for visual illustration of the execution of a program by animation of a graphical depiction of the program structure. In the Program Visualization project the user creates graphical pictures and links them to program code and data; these graphical representations or icons can be used during execution monitoring to illustrate progress through the program (IEEE Computer, Vol. 18, No. 8, August 1985, p. 20). A technique has been described for animating programs written in the object-oriented programming language known as Smalltalk. Special additional instructions are inserted at user-selected points in the program to cause a corresponding change in a graphic display when the section of the program containing such a special instruction is executed (ibid., pp. 61-71). Another system developed at Brown University likewise enables selected aspects of program execution to be illustrated graphically (IEEE Software, Vol. 2, No. 1, Jan. 85, pp. 28-39). The Pecan system noted above also provides the capability of executing the program and highlighting each statement in the program as it is executed.

Graphical techniques have been devised for writing progams by manipulation of graphical representations of program instructions. The Omega system developed at Berkeley, California allows the programmer to construct programs interactively by pointing to graphical structures on a display screen and moving them around, but the structures only represent elements of the program, the actual details of which have to be specified in a form of text (IEEE Computer, Vol. 18, No. 8, August 1985, p. 20). Other systems such as PiP (ibid., p. 23) and Think Pad (IEEE Software, Vol. 2, No. 2, Mar. 85, pp. 73-79) enable programming to be performed by drawing and modifying pictorial representations of data structures to be manipulated by the program.

However, even these known techniques fail to provide an optimum programming environment. Thus in many cases the programming still has to be performed by writing instructions in textual format and is typically done on the actual computer system which is intended to execute the finished program when it is in use. Consequently the system may have very limited facilities for program writing and debugging (a low-resolution display, precluding the use of effective graphics, and a simple monitor utility), or else the system may have such sophisticated and expensive facilities that it is not suitable or cost effective for executing the program in its intended operational environment. Furthermore existing systems for providing an animated display of program execution generally cannot illustrate multi-process programs, and/or cannot incorporate timing constraints that are important in programming real-time processes for controlling and/or responding to events occurring externally of the processor.

SUMMARY OF THE INVENTION

It is an object of this invention to provide a system and method for programming which provides an optimum programming environment for developing and testing a program irrespective of the capabilities of the processor (the 'target' processor) intended to execute the program.

It is another object of this invention to provide a system and method for programming which can be used to aid the preparation of multi-process programs.

It is also an object of this invention to provide a system and method for programming which can be used to aid the preparation of programs intended to perform real-time tasks.

According to one aspect of this invention a system for machine-assisted programming of a target processor which can execute a target programming language, incorporates a processor which, typically, is different from the target processor. The system is optimized for efficient programming and to this end includes input means and graphical display means for displaying graphical images in accordance with interactive input by an operator. Also included are storage means for storing a representation of a program for the target processor, this program representation being expressed in a definition language which is executable (or translatable into a form that is executable) on the system being used for the program development. Means operatively coupled to the display means, the input means and the storage means are provided to enable editing of the program representation by interactive manipulation by an operator of the graphically displayed graphical images. The program can then be tested with the aid of means for providing a simulation of an external environment of the target processor, and for simulating execution of the program by the target processor as if the program were expressed in the target programming language. The simulation includes simulation of interaction, in accordance with the program, of the target processor with the simulation of its environment. The execution characteristics of the program are made visible to the operator by means operatively coupled to the display means, the storage means and the simulation means for displaying the simulated execution of the program. In one embodiment this is accomplished by animation of the graphical images comprising the display of the program representation in the definition language. When development of the program is complete, translation means operatively coupled to the storage means is used for translating the program representation in the definition language into a corresponding representation in the target programming language.

Such a system provides several advantages. It allows the provisions of facilities to optimize the programming environment for the operator which are either impossible to provide with the target processor or can only be provided with substantial effort and expense. Furthermore, these same facilities are then available for programming other, different target processors without the trouble of having to re-implement them in a language executable by those processors.

It has been found that the system of this invention facilitates programming by providing rapid feedback to the operator on the behavior of a program under development, thereby enabling a significant reduction in the time taken to develop a program compared to conventional programming on the target processor itself.

Furthermore the simulation of the program execution in accordance with this invention allows investigation of program behavior in circumstances which occur only rarely and are difficult or impossible to test by practical experiment.

BRIEF DESCRIPTION OF THE DRAWINGS

Additional objects and features of the invention will become more apparent upon consideration of the following detailed description of the invention, reference being had to the accompanying drawings in which.

DETAILED DESCRIPTION

Figure 1:
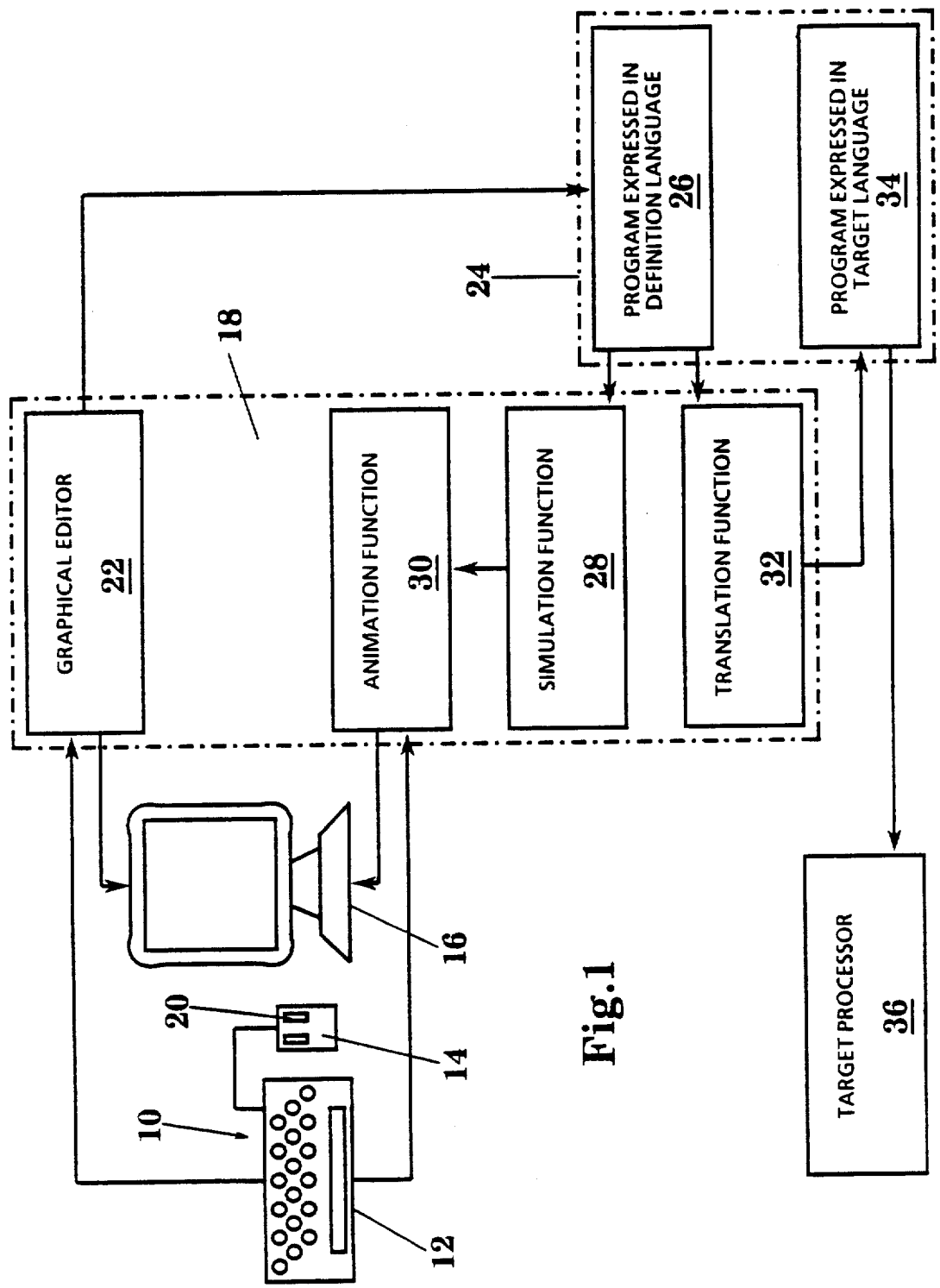
FIG. 1 is a block schematic view of a system in accordance with the invention.

FIG. 1 shows in block schematic form the major components of a system for use in programming a target processor in accordance with this invention.

Referring to FIG. 1, the system includes an input device 10 comprising a keyboard 12 and a pointing and selection device 14 (commonly known as a 'mouse'), together with a high-resolution graphical display 16. The input device 10 and the display 16 are arranged to interact in known manner with a central processor 18 to enable an operator to manipulate graphical and textual material shown on the display 16. In particular, the operator can enter information via the keyboard 12, move the mouse 14 to control the position of a corresponding cursor on the display 16 and press buttons 20 on the mouse 14 to select for manipulation items designated on the display 16 by the cursor. For convenience the processor 18 is represented in FIG. 1 in terms of the major functions which it performs. Thus the input device 10 and the display 16 interact with a graphical editor function 22 to enable a computer program to be created and edited at least in part by manipulation of graphical images. The program is stored in memory 24 associated with the processor 18, as indicated schematically at 26, and can be read by a simulation function 28 of the processor 18. This function 28 simulates execution of the program 26 on another, different processor (the target processor shown at 36) as if the program stored at 26 were expressed in a language used by that processor. The simulation function also simulates an environment external to the target processor 36 and in which the program 26 is intended to operate, together with interaction of the target processor 36 with the simulated environment under control of the program 26. An animation function 30 interacts with the input device 10 and the display 16 to provide the operator with information about the simulated execution of the program 26. In light of this information the operator may review and alter the program 26 by means of the graphical editor function 22, and then re-examine its simulated operation as indicated by the simulation function 28 and the animation function 30.

When the operator is satisfied with the operation of the program 26 as visualized in this way, the program stored at 26 is supplied to a translation function 32. This reads the program 26 and generates an equivalent version expressed in a language which can be executed by the target processor 36. The equivalent version in this target language is stored in the memory 24 as indicated schematically at 34, and can then be transferred to the target processor 36 for final testing and use.

The arrangement shown in FIG. 1 allows the programming environment (the input device 10, the display 16, the graphical editor function 22 and the animation function 30) with which the operator interacts for the bulk of the programming and testing process to be optimized for ease and efficiency of use, irrespective of the hardware and software facilities available on the target processor 36. For example, effective implementation and use of the graphical editor function 22 is significantly enhanced by the availability of the mouse 14 and the high-resolution display 16. Likewise the graphical editor function 22 and the animation function 30 are more readily implemented in certain high-level languages than others. This hardware and software is often relatively specialized and expensive, and may be either unnecessary or unsuitable for the normal use of the target processor 36, or may not even exist in a form which can be executed thereby. Typically this processor 36 may have only a keyboard, a low-resolution 24×80 character non-graphical display, and able to execute programs in languages which are widespread but not well-suited to graphical operations. Nonetheless, with the system shown in FIG. 1 any such limitations in the capabilities of the target processor 36 do not impose similar restrictions on the facilities available to the operator; nor does the provision of desirable facilities in the programming environment require the target processor 36 to be equipped with hardware or software not required for its normal operation.

Another problem that could be encountered in attempting to use the target processor 36 to develop and test a program is that such testing or debugging freqently requires the addition of special extra instructions to the program so that the processor 36 can both execute it and allow the operator to monitor and interrupt execution. Such addition of instructions results in the program under test being subtly but significantly different from the program which will actually be executed in normal use. This can result in unrepresentative behavior of the program during testing, especially where correct timing of execution of the program instruction is important. With the system of this invention any instructions required for such testing are essentially part of the simulation function 28. No special modification of the program 26 being developed is necessary for the simulation stage, so the simulation of the program execution is more closely representative of the execution of the program by the target processor 36.

Those skilled in the art will recognize that the division of functions and hardware adopted for the sake of clarity in FIG. 1 need not be reflected in the actual implementation thereof. The graphical editor function 22, the simulation function 28, the animation function 30 and the translation function 32 can be combined in a variety of ways. Furthermore they would likely interact with the memory 24 in various ways additional to the reading and writing of the programs stored at 26 and 34, for example to store and retrieve values temporarily required in the course of generating displayed images. Similarly these functions would interact with (or possibly incorporate) other functions for coordinating the overall operation of the processor 18, the input device 10, the display 16, the memory 24 and any other facilities provided by the system. The details of such arrangements and the manner of their implementation are well known to those skilled in the art. Accordingly such details need not be repeated in the following description which will be limited to aspects of particular significance to the present invention.

As noted above, the present invention permits a separation of the programming environment from the program execution environment, and exploits this separation so that each environment may be optimized for its particular purpose without compromising desirable features of the other. Thus the specific characteristics of the target processor 36 are not of primary interest, except in so far as concerns the design of the simulation function 28 to simulate those characteristics. By way of illustrative example it will be assumed that the target processor is a minicomputer (such as a 'micro-Vax' manufactured and sold by the Digital Equipment Corporation) equipped with conventional peripheral devices and intended for real time acquisition of data from and control of a borehole logging sonde, as is schematically illustrated in FIG. 2.

Figure 2:
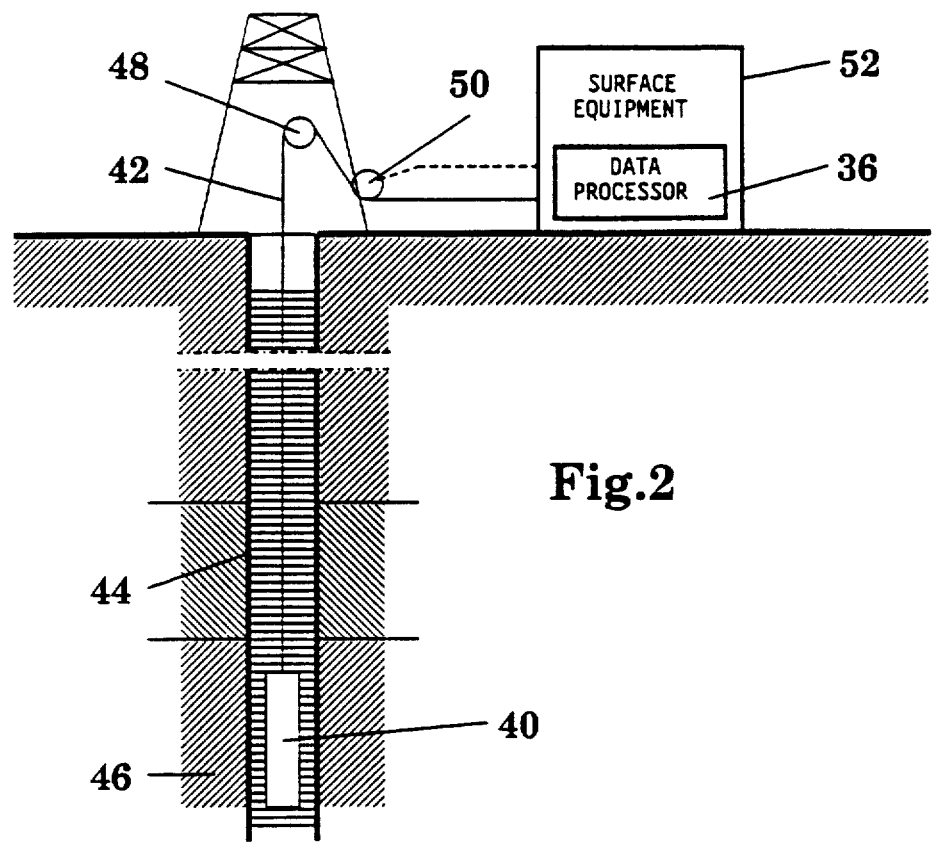
FIG. 2 is a schematic diagram of a borehole logging operation using a data processor, the programming of which can advantageously be accomplished with the aid of the present invention.

Referring to FIG. 2, an elongate logging tool or sonde 40 is suspended on an armored communication cable 42 in a borehole 44 penetrating an earth formation 46. The sonde 40 is moved in the borehole 44 by paying the cable 42 out and reeling it back in over a sheave wheel 48 and a depth gauge 50 by means of a winch forming part of a surface equipment 52. Usually the logging measurements are actually made while the sonde 40 is being raised back up the borehole 44, although in certain circumstances they may additionally or alternatively be made on the way down. The depth gauge 50 measures displacement of the cable 42 over the sheave wheel 48 and thus the depth of the tool 40 in the borehole 44.

The tool 40 includes one or more transducers for measuring parameters of the formation 46, typically by means of electrical, acoustic or nuclear techniques. The transducers generate signals related to the required parameters and these signals are suitably conditioned by processing and interface circuitry in the sonde 40 for transmission up the cable 42 to the surface equipment 52. The equipment 52 includes the target processor 36 and typically receives, decodes, amplifies and records the signals on chart and/or magnetic tape recorders as a function of the depth signals generated by the depth gauge 50. In addition the equipment 52 may process the data represented by these signals to yield indications of the required formation parameters which are also recorded. Further processing of these and other signals from the sonde 40 enables the surface equipment 52 to monitor the operation of the sonde 40 and generate signals which are transmitted down the cable 42 to control the sonde 40, for example to synchronize the operation of its component circuits or modify circuit parameters such as amplifier gain.

The precise details of the construction and operation of the sonde 40 and the apparatus for communicating signals between the sonde 40 and the surface equipment 52 are not part of the present invention, and, being well known to those skilled in the art, need not be described here. Likewise, specific techniques for processing the data received from the sonde 40 to derive values for formation parameters and control signals to be sent to the sonde 40 are not part of this invention and will not be described.

The surface equipment 52 is required to be mobile and rugged, so there are severe constraints on the configuration of the target processor 36. In particular for reasons of efficient and economic use of space and other resources, it is only practicable to include hardware and software optimized in function and cost for the control of the sonde 40 and the acquisition and processing of its measurements. Typically this requires a relatively simple low or medium resolution display and the capability to execute programs for performing control, measurement and arithmetic processing. Such programs are normally written in a high-level language such as C, Pascal or Fortran.

In contrast, an optimized programming environment typically includes sophisticated high-resolution graphics display capabilities providing the option of presenting information in several adjacent or overlapping display areas (or 'windows') simultaneously, support for symbolic data processing with appropriate data structures, and an appropriate suite of programming tools and utilities. The kind of processor typically used in the surface equipment 52 generally does not have the hardware and software capabilities to provide such features. Thus neither the system as used at the well-site nor any practical factory equivalent using essentially similar equipment is a suitable basis for efficient development and testing of programs.

Machines which are suitable for this purpose include the 1100 Series Scientific Information Processor manufactured and sold by the Xerox Corporation and capable of executing programs written in such languages as KEE (available from IntelliCorp, Menlo Park, Calif.), Lisp or Smalltalk. The present invention permits such a machine to be used for developing and testing programs for the target processor 36 even though it is significantly different from the target processor 36, and enables its advantages to be exploited for programming purposes without incurring the cost of providing its facilities directly on the processor 36 and without adversely affecting the performance of the processor 36 in its normal operational environment.

Programming languages such as KEE, Smalltalk, Loops or Objective-C are known examples of the 'object-oriented' type of language which is especially preferred for implementing the graphical editor function 22. An object-oriented language is so named because its basic programming entity is called an 'object', which has the capability to store information and to carry out predetermined operations (or methods) on that information in response to messages sent to it, and to return the result of execution of such a method to the sender of the message. An object is created as an example or instance of a class of objects having certain predefined attributes or instance variables in common. When an object is created, it automatically acquires the set of instance variables and their values and the set of methods for its class. In addition the instance variables may themselves have secondary values or annotations. The initial values for the instance variables and annotations of a class may be defined explicitly or by inheritance from another class in a hierarchy of classes.

Programming with an object-oriented language primarily involves choosing and defining classes of objects to be used in the program, defining the hierarchy of such classes, defining the instance variables and annotations for each class of objects, and defining the methods which each class of objects can perform and the messages to be sent to it to invoke those operations. The hierarchy of classes may be conveniently represented as a succession of columns, each column containing names of objects at a similar level in the hierarchy. Inheritance links are indicated by lines joining the names of the objects linked in the hierarchy, with the more senior member of the link being to the left of the junior member.

Figure 3:
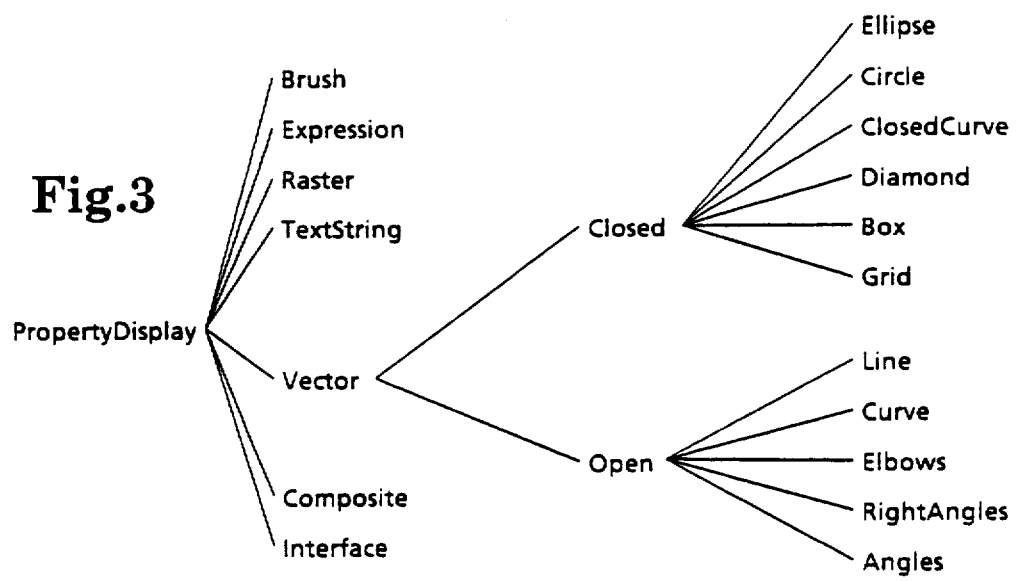
FIG. 3 is a basic inheritance tree of objects included in an object-oriented program used in one embodiment of the present invention.

In the case of the graphical editor function 22, various basic types of graphical images to be depicted on the display 16 are defined in terms of corresponding objects having a hierarchy as shown in FIG. 3. Referring to FIG. 3, the basic class is called PropertyDisplay, and has seven dependent classes called Brush, Expression, Raster, TextString, Vector, Composite and Interface. The Vector class is further divided into Closed and Open objects, which comprise respectively: Ellipse, Circle, ClosedCurve, Diamond, Box and Grid objects; and Line, Curve, Elbows, RightAngles and Angles objects. The division of objects shown in FIG. 3 is chosen to reflect the various different methods required to display each type of object. However, those skilled in the art will appreciate that other divisions and object names could be adopted.

Each object shown in FIG. 3 has instance variables which contain the data and functions needed for graphical operations involving the image defined by that object, such as displaying the image, selecting it with the mouse 14, reshaping it or moving it. Thus, for example, the Box object in FIG. 3 has an attribute known in this art as a slot (called for example DisplayFn) which contains the method for drawing a box on the display 16. Other slots for this object take the form of instance variables containing data describing the box, such as the display 'window' in which it should appear, the region of that window it should occupy and its line width. These instance variables are used by the method DisplayFn for control of basic graphics functions of the display 16 to draw the box. In like manner the Raster object would use its respective method, as identified in its DisplayFn slot, to control the drawing of an image in accordance with instance variables containing data defining the display window, the position of the image in the window and a 'bitmap' or collection of numbers which when supplied to the display 16 cause it to show the desired image. The basic graphics functions used by the methods to produce the required image on the display 16 are usually incorporated by the manufacturer as an integral part of the facilities of a processor/display system. It will be evident to one skilled in the art how such functions may be used to produce images of the basic graphical items specified in FIG. 3.

Instance variables and other slots such as the ones containing the required window and the display method are used by most or all of the objects shown in FIG. 3. Accordingly these slots are conveniently included in the basic PropertyDisplay object so that they may be inherited by all other objects shown. However, instance variables which are more specific to particular objects are included only in relation to those objects. Thus the bitmap instance variable is provided only for objects in the Raster class.

For a particular programming task, the basic graphical items indicated in FIG. 3 are used to create versions (known as 'specializations') suited to the task. Thus the extended hierarchy shown in FIG. 4, in which specializations introduced therein have their names indicated in upper case letters, may be used to produce the display depicted in FIG. 5. This represents a simple program for a target processor 36 operating in the manner described in co-pending U.S. patent application Ser. No.

767,409 in the name of Guthery, Barth and Barstow, filed Aug. 20, 1985 and assigned to the assignee hereof. In such a processor, data is manipulated by processes represented in FIG. 5 by boxes (or modules) such as 60 and is transferred between processes via streams of data items represented in FIG. 5 by grids such as 62. The processes may each be executed by respective dedicated central processing units, or they may be executed in a time-shared manner, for example by a single central processing unit.

Figure 4:
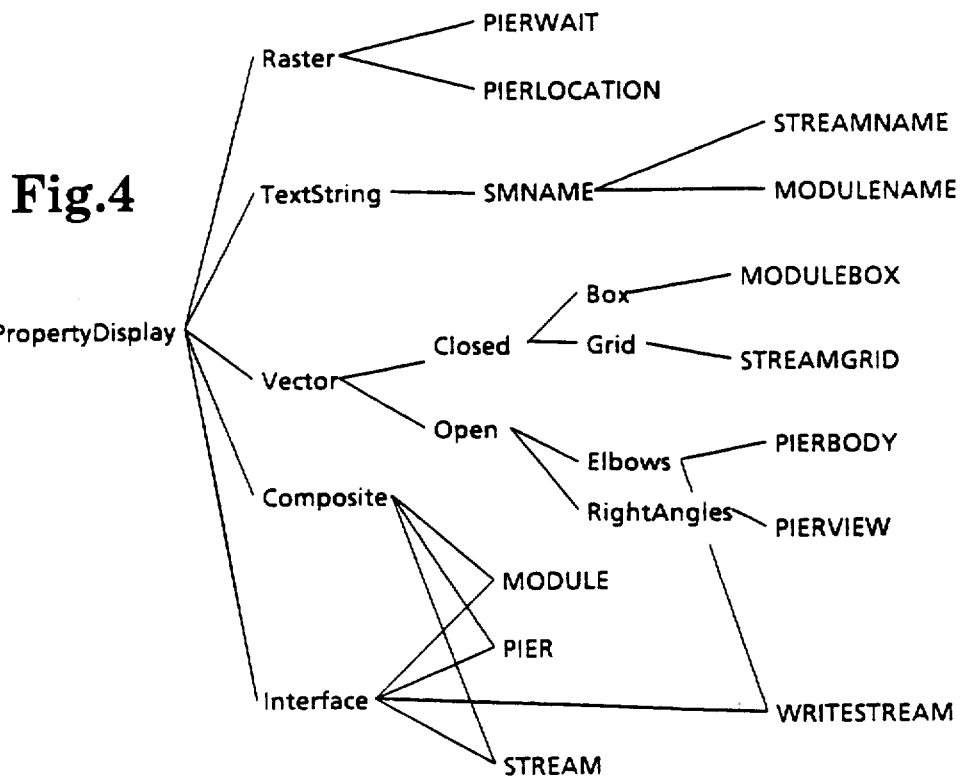
FIG. 4 is an extended version of the inheritance tree of FIG. 3.
Figure 5:
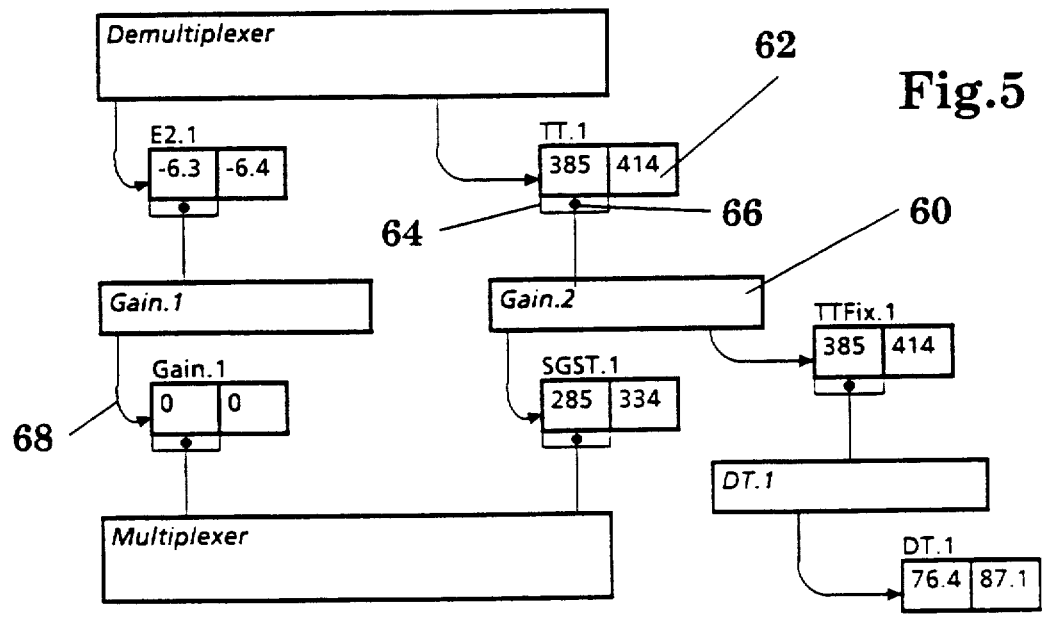
FIG. 5 is an example of a graphical display of a computer program prepared with a system in accordance with this invention.

Referring to FIGS. 4 and 5, the boxes such as 60 are examples of the display produced by the object MODULEBOX in FIG. 4, a specialization of the Box object. The groups of smaller boxes such as 62 are produced by the object STREAMGRID, a specialization of the Grid object. The U-shapes such as 64 below each group of boxes are produced by the object PIERVIEW which is a specialization of the RightAngles object, and the black dots within these U-shapes, as at 66, are produced by the object PIERLOCATION, a specialization of the object Raster with a bitmap value chosen to produce a solid dot on the display 16. The curved arrows such as 68 joining these boxes are examples of the PIERBODY specialization derived from the Elbows object. The text within the various boxes in FIG. 5 is produced by the objects STREAMNAME and MODULENAME, which are specializations of another special object SMNAME, itself a specialization of the object TextString.

These specializations may differ from the general objects from which they are derived in several ways. Thus, default instance variable values inherited from the general objects may be replaced by specific values, and additional instance variables and/or annotations may be included. In particular, data may be added specifying the graphical dependencies between images corresponding to objects and their relative positions, together with methods using this information to maintain linked images in the correct visual relationship.

Thus an instance variable defining the position of the end of a Line object may have an annotation making it dependent on the instance variable defining the position of a Raster object in a window. When the position of an object is altered, all other objects are checked for instance variables with annotations indicating a dependency on the moved object. Any dependency found causes the position of the dependent object to be updated accordingly, the necessary data for the updating being obtained by reference to the relevant instance variables of the object identified in the dependency annotation. This feature may be used, for example, to ensure that a line ending at a box remains connected to the box even if the box is moved or reshaped.

Another example of addition of instance variables in specific objects is the inclusion of an instance variable in the MODULENAME and MODULEBOX objects, referring to the MODULE object (a specialization of the Composite object) as being the whole object of which they are a part. Likewise, the MODULE object includes two instance variables identifying the MODULENAME and MODULEBOX objects as being its components. When a MODULE object is actually created to be added to the display, these two instance variables are used to create the necessary component MODULENAME and MODULEBOX objects automatically. Thereafter, the instance variables in these objects identifying the composite MODULE object provide dependency information as described above. Thus, the instance variable defining the position of the MODULENAME object is made dependent upon the instance variable defining the display region of the associated MODULEBOX object, so that the name of the module is automatically positioned within and moves with the module box.

Graphical images defined by the objects shown in FIGS. 3 and 4 are created and modified by sending messages to these objects, in a manner well known to those skilled in this art. Typically the graphical editor function 22 provides a list or menu of possible operations and associated objects on the display 16. The operator creates a module, for example, by moving the mouse 14 to position the display cursor over a 'Module' legend in a 'Create' menu on the display, and then pressing one of the buttons 20. The graphical editor function 22 is arranged to respond to this action by sending a 'create' (also known as 'instantiate') message to the MODULE object of FIG. 4. This causes the relevant methods defined within that object to be executed to generate a new (module) object as a replica of the MODULE object, prompting the operator for a name for the module, where it is to be positioned and its size (these latter being conveniently entered by further manipulation of the mouse 14). The necessary storage space in memory 24 is assigned to the new object, any necessary dependencies are set up, data needed for display is computed (by means of such dependencies for example), and then a message is sent to the DisplayFn slot of the new object to cause the method identified thereby to be executed to display the module.

Images can be modified in similar manner, by selecting them with the mouse 14 and then selecting appropriate options from an appropriate menu on the display 16. The graphical editor function 22 responds to such a selection by identifying the object corresponding to the selected image and sending it the appropriate message. The corresponding method in that object carries out the required function, thereby updating any other affected images indicated by dependencies as explained above. The method may, for example, use three items of data: the object to be modified, the instance variable(s) thereof to modify and the new value(s). All affected images as indicated by dependencies are erased from the display 16, the value(s) of the specified instance variable(s) are changed and the changes propagated to the other affected objects via the dependencies, and the related images are redisplayed in accordance with the new value(s). The instance variable modified need not be directly associated with the object in question. Thus, modifying a module image may involve altering the instance variable defining the display region of its component MODULEBOX object. The MODULENAME object does not need to be explicitly referred to in invoking the method, since the dependency of the MODULENAME object on the MODULEBOX object automatically causes its position to be changed as necessary.

Operation of the input device 10, the display 16 and the processor 18 to facilitate the above-described operations, for example to coordinate movement of the display cursor with operator movement of the mouse 14 and to alter the display (such as by interchanging black and white) to indicate a selected display image, is well known in the art, and generally uses functions built-in to the system. Accordingly details of such operation need not be given here.

Since any change in the appearance of a display image can be effected by sending the appropriate message to the object corresponding to that image, the animation function 30 can be readily implemented in this case by arranging, as described below, for operation of the simulation function 28 to send such messages to each object upon simulated execution of the program element depicted by the image corresponding to that object. Such animation is a form of graphical editing coordinated by the simulation function 28 rather than by the operator.

The set of objects shown in FIG. 4 is concerned solely with the graphical depiction of components of the program 26 being prepared by the operator. Details of these components relating to the content of the program 26 itself are stored by means of a second set of objects forming the hierarchy shown in FIG. 6. Each possible component in the overall structure of the program 26 has a corresponding object class, which has instance variables for information about that type of object. For example, the STREAM object in FIG. 6 includes instance variables for defining the type of data items to be stored in the stream, the identity of the module writing data items to it and the identity of any module that reads data items from it. Likewise, the MODULE object includes instance variables for defining the identity of the stream(s) it reads from and writes to, and for identifying a block of program text defining the details of the process represented by that module. The PROGRAM object has instance variables listing the modules and streams comprising the program 26.

Figure 6:
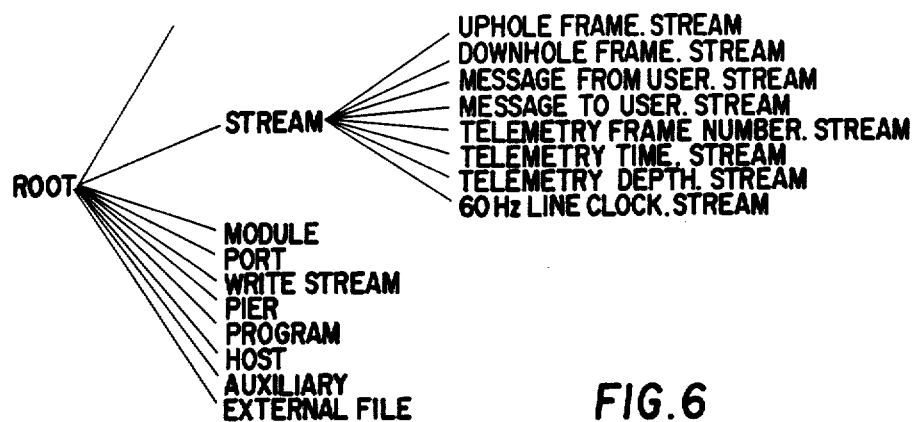
FIG. 6 is another inheritance tree of objects included in an object-oriented program used in one embodiment of the present invention.

The hierarchies of objects in FIGS. 4 and 6 are separate and independently stored in the memory 24, though objects in each may contain references to objects in the other. Thus a MODULE object in the hierarchy of FIG. 4 is distinct from the correspondingly-named object in FIG. 6. However, when a new graphical module object is created as described above by means of a message sent to the MODULE object of FIG. 4, a corresponding message is also sent to the MODULE object of FIG. 6, causing a like-named instance of a module object to be created in that hierarchy. The object thus created in the hierarchy of FIG. 4 holds data required for purposes of graphical display of the module, while the corresponding object in the hierarchy of FIG. 6 holds data required for program generation purposes. A similar procedure is followed in creating instances of the STREAM objects of FIGS. 4 and 6, and illustrative examples of specific stream objects are included in FIG. 6. In the case of modules and streams of data items, the identity of each is also added as a value of an instance variable in the PROGRAM object of FIG. 6.

Using the functions described above the operator can create, link and modify graphical images on the display 16 to produce a composite image such as that shown in FIG. 5. The graphical editor function 22 responds to the operator's actions both to produce the display using objects in the hierarchy shown in FIG. 4, and simultaneously to create and maintain a corresponding set of objects in the hierarchy shown in FIG. 6, defining the overall structure of the multi-process program 26 depicted by the display thus produced.

Each process or module 60 requires a program defining the details of the operations it is to perform within the overall structure. This program and its inter-relationship within the overall structure to the programs for other modules will ultimately be expressed in the high-level target language which the target processor 36 is equipped to execute. However, the program is conveniently expressed within a module 60 in a 'definition' language which is well-suited to execution by the simulation function 28.

The definition language used to specify the program within a module is chosen so that execution of the program 26 can be simulated by the simulator function 28 and translation of the program 26 into the target language for the target processor 36 can be accomplished by the translation function 32. Typically, the definition language is one that is itself executable on the processor 18. Thus, where the processor 18 is capable of executing a symbolic language such as Lisp, the program in each module may be expressed in Lisp. In order to ensure that the program 26 can ultimately be translated into the target language, certain constraints on the definition language must be met: only those basic statements, commands and other operators in the definition language which have direct counterparts in the target language may be used without addition or modification; additional statements, commands and other operators may need to be constructed as secondary functions or procedures composed of the basic statements, commands and other operators in the definition language, to express features of the target language it is desirable to use but which have no direct counterpart in the definition language; and it may be necessary to identify and exclude use of certain features of the target language which it is not possible to express accurately or precisely in the definition language. To this end, a definition language may be used which is not directly executable by the processor 18, but which is readily translated into a language that is so executable and which can also be processed by the translation function 32 to produce the target language version 34.

Figure 7:
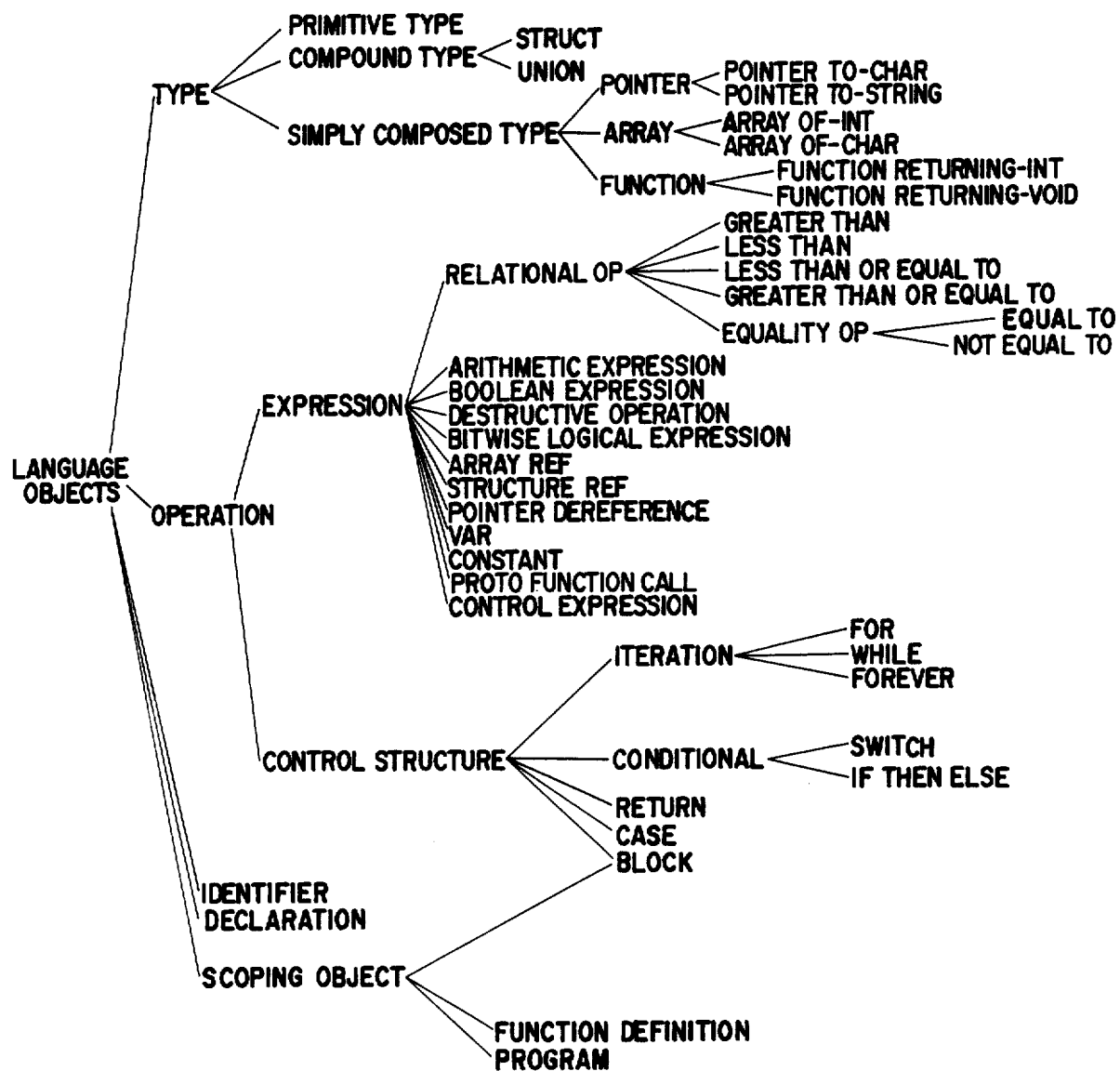
FIG. 7 is a generalization tree of objects included in an object-oriented definition language used in one embodiment of the present invention.

In this latter case it is convenient to express the definition language in terms of an object-oriented language. The statements, commands and other operators of the definition language are defined as a hierarchy of object classes, an example of which is shown in FIG. 7 in the form of a 'generalization tree' for the high-level language C. This is used in a manner known to those skilled in the art to implement the definition language. Each class has instance variables corresponding to its component parts. Thus the parts of an object representing the well-known 'If-Then-Else' programming construct can be a Condition to be tested by the If statement, a Then-Clause to be executed if the test is satisfied and an Else-Clause to be executed if not. Each object class is provided with methods for responding to messages to translate the values of such instance variables into corresponding program text in a language such as Lisp which can be executed by the processor 18 and into the target language of the target processor 36. This translation can be accomplished, for example, by reference to a look-up table containing correspondences between statements, functions and operators in the definition language (including composite secondary functions and procedures) and the related statements, functions and operators in the language of the processor 18 or the processor 36 as appropriate. The program text is essentially stored in the form of objects from the classes shown in FIG. 7, linked in accordance with the program text to form a 'parse tree' which can be used by an interpreter to execute the program in known manner. Objects of the Program class shown in FIG. 7 are used to store the program text for each module, the identity of the Program object containing the text for a module being placed in the relevant instance variable of the MODULE object (FIG. 6) for that module.

Certain of the functions and procedures specified in the definition language are of a kind whose execution will conveniently be illustrated during simulated execution of the program 26. To this end, these functions and procedures are specified so as to include instructions to send messages to the appropriate objects corresponding to the graphical images of the program components involved in the operation. Thus a function to write a value to a stream of data items would include an instruction to send a message to the STREAM object (see FIG. 4) corresponding to the particular data stream involved, the effect of the message being to redisplay the graphical image controlled by that object to produce an extended stream including the new value.

The operations to be performed by a module 60 are defined by the operator by first selecting the module and an appropriate menu item on the display 16. This causes the graphical editor function 22 to send a message to the object corresponding to the module to provide a new window on the display 16, within which text can be typed and edited to define the process represented by that module. This process can be facilitated by providing some of the text automatically via the graphical operations used to define the overall structure of the program 26. For example, when a module such as 60 is linked to read data items from a stream of items such as 62, the necessary messages are sent to the PIERVIEW object to create and position the U-shape 64 to represent this link. In addition, however, the PIERVIEW object includes methods to add a new entry to a table in the memory 24 of all such connections, listing the module and stream associated with each connection. A similar entry is made for each module and any stream of data items to which it writes. When a module is selected for definition of the operations it is to perform in the program 26, the method invoked by the message sent to the corresponding object scans this table and creates a standard text template, listing the streams to which the module writes data items and its connections for receiving data from them. This list is formatted as a set of formal declarations of variables in the syntax of the definition language in use. Standard commands and statements required in any program in that language, such as 'begin' and 'end' statements, may also be included in the template. The template is then displayed to the operator in the window opened in response to selection of the module, and provides a framework within which the operator may commence specifying the text of the program for that module.

When the complete program 26 has been specified as described above, and stored in the memory 24, its operation is examined by means of the simulation and animation functions 28 and 30. As noted above, this may entail a preliminary translation of the program text in each module from the definition language to a language that the processor 18 can execute.

Figure 8:
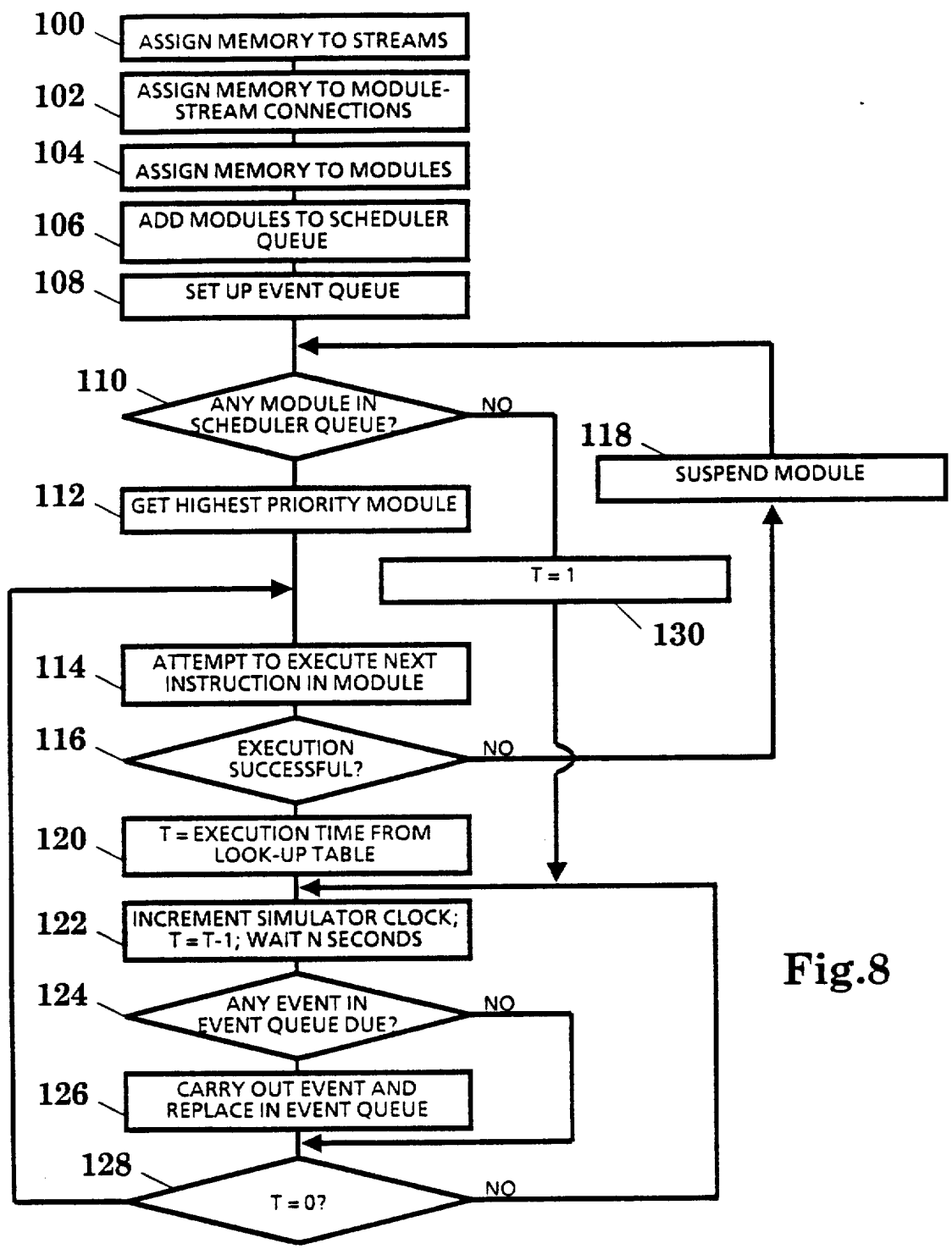
FIGS. 8 and 10 are flow charts showing steps involved in simulation and animation of a progam in one embodiment of the present invention.

More specifically, the simulation function 28 causes the program 26 to be executed by the processor 18 in the manner of an interpreter, following the procedure illustrated by the flow chart in FIG. 8.

Referring to FIG. 8, at step 100 the processor 18 assigns a section of the memory 24 to each stream of data items listed in the PROGRAM object of FIG. 6; then at step 102 the table in the memory 24 of connections between modules and streams is used to assign a section of the memory 24 to each such connection, and the address of the section of memory for the stream corresponding to each connection is stored in the memory section for that connection as a pointer to the stream. At step 104 a section of the memory 24 is assigned to each module listed in the PROGRAM object of FIG. 6, and the address of each module's memory section is stored, for example in a section of memory designated to function as a stack, together with the addresses of the streams and connections associated with that module. Such initialization operations are well known in relation to management of computer resources by those skilled in the art.

Thereafter the simulation function 28 prepares for execution of the process represented by each module. In the case of a multi-process program intended to be executed on a single processor, only one module can actually be executed at a time. Therefore this step 106 involves, for example, listing the modules in a table representing a queue of processes awaiting execution. Each module thus listed is assigned a relative priority in the queue in accordance with known techniques for scheduling processes to share resources in this manner, for example in dependence upon the time at which the module was added to the queue or the expected duration of its execution.

As will be explained below, the simulation includes the external environment of the processor 36 and the interaction of the processor 36, in accordance with the program 26, with this simulated environment. Thus, in the case of a program for controlling a borehole logging sonde as described above with reference to FIG. 2, the simulation conveniently includes such operations as the reception of data items from the sonde 40 and the transmission of data items representing commands to the sonde. The simulation is arranged so that the simulated transmission of a command, for example, has the same effect on the simulated data items subsequently received as the real command would have on data items received from the real sonde. To this end, another table representing a queue of events, such as transmission of a command to the sonde and reception of a data item therefrom, is formed at step 108. The entry for each event includes a time value when that event should occur in the simulation.

The simulation further includes the time-dependent behavior of the processor 36 and its external environment, for which purpose the period of time the processor 36 requires to execute each possible instruction in the program 26 is listed in a table forming part of the simulation function 28. These execution times and the times of events in the queue set up at step 108 are expressed in terms of the value of a counter representing a clock which is advanced by the simulation function as simulated execution of each instruction takes place.

More particularly, at step 110 the simulation function 28 inspects the queue of modules awaiting execution to determine whether there is any module in the queue. If there is, that module (or the highest priority module if there are several) is chosen at step 112. This step 112 is arranged to send a message to the graphical MODULE object (FIG. 4) for the chosen object, to cause it to indicate that the module is commencing execution (for example by interchanging black and white in the image of the module on the display 16).

The simulation function 28 then finds the block of text defining the program for that module, by reference to the appropriate instance variable in the MODULE object (FIG. 6) for that module, and attempts to execute the first instruction of the selected module, at step 114. The simulation function 28 tests whether execution has successfully been accomplished at step 116. The instruction may involve reading a data item from a stream of such items, for example, but there may not yet be any value in that stream, especially when simulated execution of the program 26 has just started. In such a case, the test at step 116 fails and the simulation function 28 proceeds to step 118 where it suspends simulated execution of the module. Suspension of execution (also known as context switching) typically involves making an entry in a table in the memory 24 to identify the module being suspended, the point in the module's program where it was suspended and the stream of data items from which it is awaiting an item. The simulation function then returns to step 110 to search for another module in the queue awaiting execution.

As noted earlier, execution of some functions contained in the program 26, such as writing a data item to a stream of such items, is depicted in the animation of the program 26, by virtue of instructions in those functions which send messages (as represented at 30 in FIG.1) to the graphical objects corresponding to the relevant images on the display 16 and cause them to change appearance accordingly.

If the test at step 116 indicates successful simulated execution of an instruction at step 114, the function 28 proceeds to step 120 of FIG. 8, where a counter T is set equal to the time for execution of that instruction on the target processor 36, as listed in the table of such values described above. At step 122 the counter or clock maintained by the simulation function 28 is advanced by one, the counter T is decremented by one, and the function 28 waits for a period having a duration set by a variable N. The value of this variable N can be altered by the operator to control the speed at which simulated execution of the program 26 by the simulation function 28 takes place. This advantageously allows examination of operation of the program 26 in varying degrees of detail depending upon the delay determined by the value of N.

At step 124, the new value of the clock counter is compared to the values for events stored in the event queue. If any event is required to occur at the current simulated time as indicated by the clock counter, this event is performed as described below, and possibly re-entered in the event queue, at step 126. If no such event is due, the function 28 skips this step. In either case, the function then reaches step 128, at which the value of the counter T is tested to see if the simulated time for execution of an instruction has expired. If not the procedure returns to step 122 to increment the clock counter again. Otherwise the function 28 proceeds to the next instruction in the program of the module whose execution is currently being simulated.

If every module in the program 26 is suspended, the test at step 110 causes the simulation function 28 to set the counter T to a value of one, at step 130, and then to proceed directly to step 122. There the clock counter is incremented and the event queue is checked. This sequence is repeated until an event occurs which enables one or more of the suspended modules to be re-activated and placed on the queue of modules to be executed.

Figure 9A:
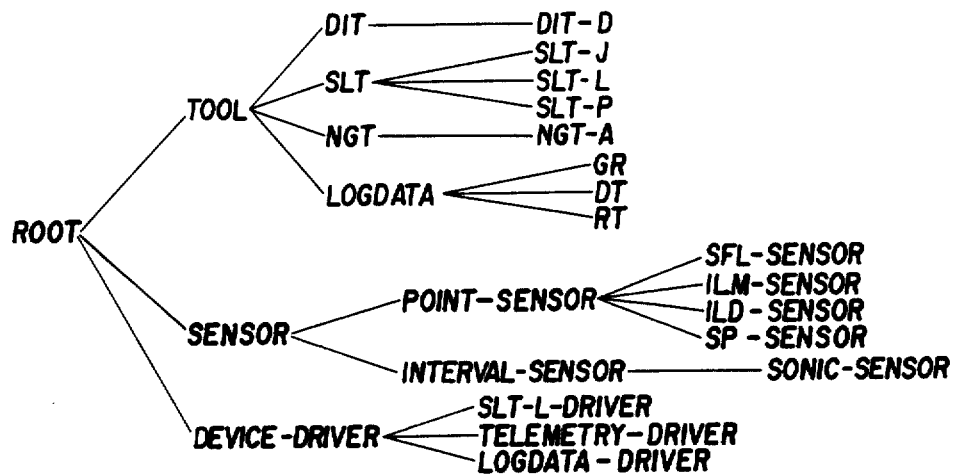
FIGS. 9a and 9b are inheritance trees of objects used in simulation of a borehole environment in one embodiment of the present invention.
Figure 9B:
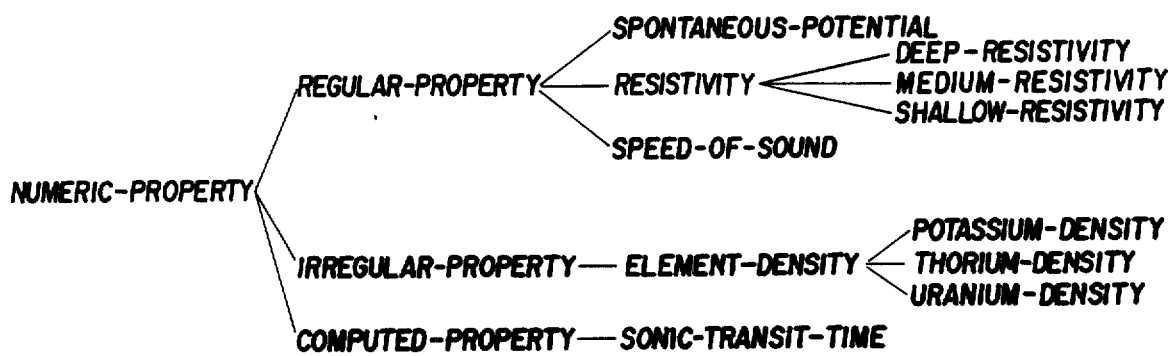

Implementation of these events to simulate interaction of the processor 36, under control of the program under development, with the simulated external environment can conveniently be accomplished by representing each event with an individual object in an object-oriented language. In the case of a borehole logging tool this may involve, for example, objects representing the formations 46 traversed by the borehole 44 and their petrophysical properties, the borehole 44 itself, the sonde 40, the armored cable 42 providing the communication link to the surface equipment 52 and any special interface equipment connecting the cable 42 to the processor 36. Each such object includes instance variables and other slots defining the properties of the corresponding part of the environment and its interrelationship to other such parts. Illustrative hierarchies of object classes of various kinds for representing sondes and formations respectively are shown in FIGS. 9a and 9b.

Figure 10:
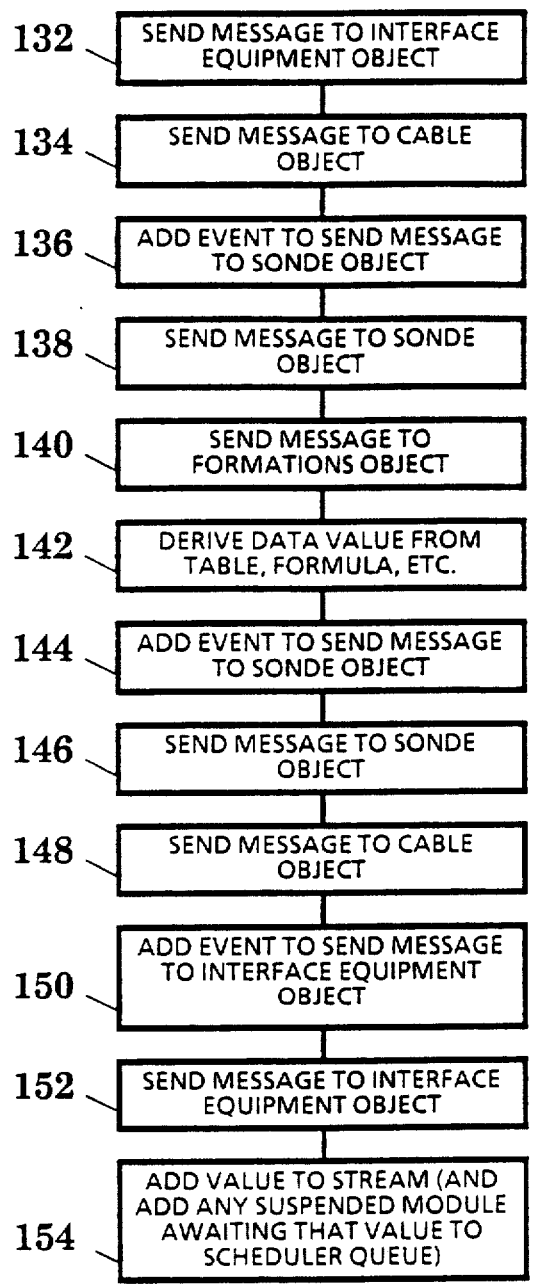

Thus, as illustrated in FIG. 10, transmission of a command by the processor 36 to the sonde 40 to perform a measurement and return the result to the processor 36 is simulated by the execution of an instruction at step 132 which results in a message being sent to the object representing the interface equipment. This object reacts by executing a method in a slot associated with the received message to send another message, at step 134, to the object representing the cable 42, which in turn at step 136 adds an event to the event queue to send a message to the object representing the sonde 40. The time that this new event is to occur relative to the time at which it is added to the queue may be chosen to simulate the propagation time of a signal along the cable 42 if desired. When the new event is carried out, at step 138, the message it sends to the object for the sonde 40 causes that object to simulate initiation of a measurement. Specifically, this object sends a message at step 140 to the object representing the formations 46 to supply a value for the desired measurement.

Such values may be derived as indicated at step 142 in a variety of ways. Thus, for example, a set of values may be stored in a look-up table, each value being indexed by some parameter. In the case of a borehole logging simulation one parameter of interest would be the speed of travel of the sonde 40 (as simulated by the simulation function 28) through the borehole 44. This parameter could be combined with the clock counter value to derive a depth for the simulated sonde in the borehole. The depth value could in turn be used to determine a data value to be supplied by the simulated sonde to the program 26, by reference to the table of such values, indexed according to depth. This would facilitate simulation of the behavior of the program 26 as it receives data values from a sonde passing different types of formations traversed by a borehole.

Alternatively the formations object may have a slot containing a method which responds to the message sent by the sonde object at step 140, to compute a value according to a predetermined formula.

The derivation of a data value in a real borehole logging operation may involve some time delay. Thus a measurement of the travel time of acoustic energy through formations 46 must take at least the duration of the time interval being measured plus the delays inherent in the operation of devices for transmitting and receiving the acoustic energy. In order to include realistic simulation of this delay, the formations object adds an event to the queue at step 144 to return the derived value to the sonde object after an interval dependent upon the value to be returned. When this interval has elapsed the formations object is triggered by this event to send a message to the sonde object conveying the required value, at step 146.

The sonde object in turn forwards the value by means of a message to the cable object, at step 148, causing an event to be added to the event queue at step 150 with a timing chosen to represent any transmission delays in the same manner as at step 136 described earlier. When this event subsequently occurs at step 152 a message conveying the data value is sent to the object representing the interface equipment. This object responds by executing a method which adds the value to the appropriate stream of data items. This action automatically invokes a check to find any module whose execution is suspended and awaiting addition of a data item to that stream. If any such module exists it is added to the queue of modules awaiting execution. This procedure for reactivating modules waiting for data items is executed whenever a value is added to a stream from any source, for example a module whose execution is currently being simulated, as described in the afore-mentioned U.S. patent application Ser. No. 767,409.

The above-described generation of simulated data can be extended to include the effects, for example, of sonde operating parameters and of changes in those parameters in response to commands from the program 26 whose execution is being simulated. Thus, the effect of the gain of an amplifier in the simulated sonde could be introduced at step 148 in FIG. 9 by a mehtod in the sonde object which multiplies the value received from the formations object by a simulated gain value before the data item is forwarded to the cable object. The effect of commanding a change in this gain value can be simulated by means of an appropriate message sent to the sonde object via the objects representing the interface equipment and the cable, as at steps 132 to 138 in FIG. 9. The sonde object simulates implementation of the command by executing a method to alter a value in a look-up table, or a factor in a formula, which is referenced by the method for multiplying the gain with each value received from the formations object. Operations which occur autonomously in the sonde 40, such as checking an input register at regular intervals to find if a command has been received, can be simulated by placing an event on the event queue to occur after that simulated interval has elapsed. When the event subsequently occurs, it causes the appropriate operations to check the register and places itself back on the event queue to occur again after the same interval.

It should be noted that the operations described above, such as placing events on the event queue and carrying out the tasks specified by such events, for effecting simulation of and simulated interaction with the external environment of the target processor 36 do not themselves cause any change of the simulated time provided by the simulator clock maintained at step 120 of FIG. 8. Thus the real time taken by the processor 18 to carry out these simulation tasks does not interfere with the simulation of the time-dependent operation of the target processor 36. Likewise the time taken by the processor 18 to execute instructions in the definition language which send messages to graphics objects to effect the animation function 30 as described earlier, and the time taken to perform animation operations, cause no interference with this simulation since the time that would be taken by the processor 36 to execute each such instruction is independently incorporated into the simulation at step 120. Furthermore, if the processor 18 is sufficiently powerful to execute the program 26 under test faster than the target processor 36 and also perform the simulation and animation functions, it is possible to simulate execution of the program 26 by the target processor 36 at a rate faster than in real time.

The simulation and animation functions 28 and 30 preferably incorporate provision for the operator to interact with and control, via the input device 10 and the display 16, the progress of the simulation of program execution by the target processor 36. Thus the operator is typically able to stop and start the simulation at will, alter the value of the number N of real seconds that elapse at step 122 of FIG. 8, and vary other parameters such as the simulated speed of travel of the simulated sonde 40 through the simulated borehole 44. The details of the simulation and animation functions 28 and 30 to provide such capabilities may be provided by means of menu options, for example, as will be evident to those skilled in the art.

A particular advantage of the present invention is the possibility of simulating and examining behavior of the program 26 under development in circumstances that are difficult or impossible to duplicate in real test conditions. Thus a perturbation in the operation of the sonde 40 may be known to occur only very rarely and may be reproducible only by extensive alteration of the sonde's component parts, which may be expensive, time-consuming or even unacceptable. With the present invention such perturbed operation can readily be simulated by appropriate modification of the methods and instance variable values of the object representing the sonde 40 in the simulation of the external environment of the processor 36. This facilitates testing of error detection and correction routines in the program 26. Likewise changes in the design of the sonde 40 or other equipment can be incorporated and tested in conjunction with the program 26 in the simulation quickly and easily.

When the operation of the program 26 as indicated by the simulation and animation functions 28 and 30 is satisfactory, the program 26 as represented in the definition language is supplied to the translation function 32 to generate the desired version of the program expressed in the target language as represented at 34. This version may be expressed in a high-level language for example, in which case it would be processed in conventional manner by compiler and linker programs to yield a version for execution by the target processor 36. This version would then be tested upon the target processor 36, any remaining minor changes being made to the target language version 34 for example.

There has been described and illustrated herein methods and systems in accordance with the present invention for assisting the programming of a target processor. While particular embodiments of the invention have been described, it is not intended that the invention be limited thereby. Therefore it will be apparent to those skilled in the art that various changes and modifications may be made to the invention as described without departing from the spirit and scope of the appended claims.

We claim:

1. A system for machine-assisted programming of a target processor which can execute a target programming language, comprising:

input means and graphical display means for displaying graphical images in accordance with interactive input by an operator;

storage means for storing a representation of a program for said target processor, said program representation being expressed in a definition language;

means operatively coupled to said display means, said input means and said storage means for editing said program representation by interactive manipulation of said displayed graphical images;

means operatively coupled to said storage means for providing a simulation of an external environment of said target processor, and for simulating execution of said program by said target processor as if said program were expressed in said target programming language and including simulation of interaction of said target processor with said simulation of said environment in accordance with said program;

means operatively coupled to said display means, said storage means and said simulation means for displaying said simulated execution of said program; and translation means operatively coupled to said storage means for translating said program representation in said definition language into a corresponding representation in said target programming language.

2. The system of claim 1, wherein said simulated execution of said program is displayed graphically by modification of said displayed graphical images.

3. The system of claim 1, wherein said program includes multiple processes and said simulated execution of said program includes simulation of assignment of processor resources amongst processes awaiting execution.

4. The system of claim 1, wherein said simulation includes simulation of the relative times taken by said target processor to execute instructions when expressed in said target programming language.

5. The system of claim 1, wherein said simulation means includes means for maintaining a queue of events related to said external environment together with an indication of a time in said simulated execution when each said event is to occur.

6. The system of claim 1, wherein said editing means is arranged to maintain a first set of data defining said graphical images and a second set of data defining corresponding components of said program representation.

7. A method for machine-assisted programming of a target processor which can execute a target programming language, comprising:

displaying graphical images in accordance with interactive input by an operator;

storing a representation of a program for said target processor, said program representation being expressed in a definition language and being generated by interactive manipulation of said displayed graphical images;

providing a simulation of an external environment of said target processor, and simulating execution of said program by said target processor as if said program were expressed in said target programming language and including simulation of interaction of said target processor with said simulation of said environment in accordance with said program;

displaying said simulated execution of said program; and translating said program representation in said definition language into a corresponding representation in said target programming language.

8. The method of claim 7, wherein said simulated execution of said program is displayed graphically by modification of said displayed graphical images.

9. The method of claim 7, wherein said program includes multiple processes and said simulated execution of said program includes simulation of assignment of processor resources amongst processes awaiting execution.

10. The method of claim 7, wherein said simulation includes simulation of the relative times taken by said target processor to execute instructions when expressed in said target programming language.

11. The method of claim 7, including maintaining a queue of events related to said external environment together with an indication of a time in said simulated execution when each said event is to occur.

12. The method of claim 7, including maintaining a first set of data defining said graphical images and a second set of data defining corresponding components of said program representation.

* * * * *